Patented Feb. 10, 1931

1,792,096

UNITED STATES PATENT OFFICE

WILLIAM P. ter HORST, OF NITRO, WEST VIRGINIA, ASSIGNOR TO THE RUBBER SERVICE LABORATORIES CO., OF AKRON, OHIO, A CORPORATION OF OHIO

MANUFACTURE OF MERCAPTO THIAZOLE DERIVATIVES

No Drawing. Original application filed August 4, 1927, Serial No. 210,713. Divided and this application filed July 6, 1928. Serial No. 290,884.

The present invention relates to the manufacture of vulcanization accelerators comprising particularly those compounds obtained by the reaction of amines upon the thiophosgene and like derivatives of the mercapto thiazoles and analogous compounds. The manufacture of the preferred class of accelerating compounds will be readily understood from the following description and examples.

Mercapto-aryl-thiazole compounds and the metallic salts of such compounds heretofore have been described as providing a class of vulcanization accelerators capable of imparting certain desirable properties to a rubber mix and furthermore capable of producing such a rubber product in a relatively short vulcanization period. It has now been found that a rubber product possessing greatly enhanced properties results after an equally short vulcanization period by replacing mercapto-benzo-thiazole or its metallic salts with certain reaction products thereof of a type hereinafter set forth.

The products comprising the subject-matter of the present invention include those compounds obtained by treating the thiophosgene and analogous derivatives of mercapto-aryl-thiazoles and their metallic salts with amines and preferably with aliphatic amines.

One example of the preferred type of compounds is the product resulting from treating the thiophosgene reaction product of the sodium salt of mercapto-benzo-thiazole with piperidine. Such a produce is readily manufactured in the following manner.

The sodium salt of mercapto-benzo-thiazole, obtained preferably by dissolving substantially 167 parts (one molecular proportion) of mercapto-benzo-thiazole in an alkaline solution containing slightly more than an equivalent molecular proportion of caustic soda, was treated with approximately 115 parts (one molecular proportion) of thiophosgene by passing the thiophosgene at a relatively slow rate beneath the surface of the solution while agitating. A yellow precipitate resulted. The reaction involved is an exothermic change and since heat was developed, cooling means should be provided to prevent the reacting mass from overheating. If the thiophosgene is run into the thiazole solution sufficiently slowly, however, the speed of the reaction is thereby controlled and no cooling of the mass is necessary. After the reaction was completed, the resulting product was filtered and the precipitate washed with dilute caustic soda solution and then dried, preferably in a vacuum. The thiophosgene reaction product of sodium mercapto-benzo-thiazole, obtained as described, melts at from about 106 to 112° C. This product can be purified if desired by crystallization from chloroform.

In a similar manner, dithiazyl-tri-thiocarbonate was obtained by reacting thiophosgene with sodium mercapto-benzo-thiazole in the ratio of one molecular proportion of the former to two molecular proportions of the latter. Similarly to the above mentioned process, perchlor-methyl-mercaptan ($CSCl_4$), a chlorine derivative of carbon disulfid has been reacted with various mercapto thiazole compounds, such as sodium mercapto-benzo or tolyl thiazoles and the like to produce reaction products of the type specifically described in the example hereinbefore set forth in detail.

The various reaction products described, have been found to possess the characteristics of accelerating the vulcanization of rubber mixes, but their usefulness in this particular is greatly increased by further treatment of the reaction products described with organic derivatives of ammonia particularly the amines, for example piperidine, diphenylguanidine and other primary and secondary amines and amino derivatives, preferably of the aliphatic series such as aldehyde ammonia, piperazine, the biguanides, tetramethyl-ammonium hydroxide, ethylamine, diethylamine and homologous amino compounds.

The piperidine derivative of the reaction products of the type of compounds hereinbefore mentioned was obtained by treating approximately one molecular proportion of the thiophosgene reaction product of sodium mercapto-benzo-thiazole with more than an equi-molecular proportion of piperidine while agitating. The reaction that took place was an exothermic change and the ingredients were added preferably at such a rate that the temperature of the mass was maintained during the course of the reaction at from 70 to 80° C. After all the reaction product of the sodium salt of mercapto-benzo-thiazole with thiophosgene had been added to the piperidine, the mass was allowed to stand for a period of time to permit the reaction to be completed, whereupon the syrup-like product was washed with water to remove unchanged piperidine and any other soluble products present and the insoluble residuum was then dried in any suitable manner, preferably under a vacuum. The reaction product comprising the combination of substantially equi-molecular proportions of the ingredients employed is soluble in terpene hydrocarbons and may be used if desired in solution in a solvent of that form, but preferably the product is employed without such solvent.

Other amines have been employed in place of piperidine in the reaction set forth above. Thus, piperidine has been reacted upon the product obtained by the union of per-chlormethyl-mercaptan and sodium mercapto-benzo-thiazole; diphenyl-guanidine has been reacted with an equal weight and also in the proportion of from one-half to two mols of the guanidine to approximately one mol of the thiophosgene reaction product of sodium mercapto-benzo-thiazole. Other organic derivatives of ammonia likewise combine with the reaction products of other mercapto-aryl-thiazole compounds with thiophosgene and the like to produce reaction products of the type set forth.

This case is a division of U. S. Patent No. 1,682,729, issued August 28, 1928.

What is claimed is:

1. The process for preparing a mercapto thiazole derivative comprising the reaction between an amine and the product obtained by reacting a salt of mercapto-benzo-thiazole with a chlorine derivative of carbon disulfid.

2. The process for preparing a mercapto thiazole derivative comprising the reaction between a secondary amine and the product obtained by reacting a metallic salt of mercapto-benzo-thiazole with a chlorine derivative of carbon disulfid.

3. The process for preparing a mercapto thiazole derivative comprising the reaction between a secondary aliphatic amine and the product obtained by reacting sodium mercapto-benzo-thiazole with a chlorine derivative of carbon disulfid.

4. The process for preparing a mercapto thiazole derivative comprising the reaction between piperidine and the product obtained by reacting sodium mercapto-benzo-thiazole with a chlorine derivative of carbon disulfid.

5. The process for preparing a mercapto thiazole derivative comprising the reaction between piperidine and the product obtained by reacting sodium mercapto-benzo-thiazole with thiophosgene.

6. The process for preparing a mercapto thiazole derivative comprising the reaction between an amine and a product obtained by reacting substantially equi-molecular proportions of sodium mercapto-benzo-thiazole with thiophosgene.

7. The process for preparing a mercapto thiazole derivative comprising the reaction between a secondary amine and a product obtained by reacting substantially equi-molecular proportions of sodium mercapto-benzo-thiazole with thiophosgene.

8. The process for preparing a mercapto thiazole derivative comprising the reaction between a secondary aliphatic amine and a product obtained by reacting substantially equi-molecular proportions of sodium mercapto-benzo-thiazole with thiophosgene.

9. The process for preparing a mercapto thiazole derivative comprising the reaction between piperidine and a product obtained by reacting substantially equi-molecular proportions of sodium mercapto-benzo-thiazole with thiophosgene.

10. As a new product a mercapto thiazole derivative prepared by the reaction between an amine and the product obtained by reacting sodium mercapto-benzo-thiazole with a chlorine derivative of carbon disulfid.

11. As a new product a mercapto thiazole derivative prepared by the reaction between a secondary amine and the product obtained by reacting sodium mercapto-benzo-thiazole with thiophosgene.

12. As a new product a mercapto thiazole derivative prepared by the reaction between a secondary aliphatic amine and the product obtained by reacting sodium mercapto-benzo-thiazole with thiophosgene.

13. As a new product a mercapto thiazole derivative prepared by the reaction between piperidine and the product obtained by reacting sodium mercapto-benzo-thiazole with thiophosgene.

14. As a new product a mercapto thiazole derivative prepared by the reaction between piperidine and the product obtained by reacting substantially equi-molecular proportions of sodium mercapto-benzo-thiazole and thiophosgene.

15. The process for preparing a mercapto thiazole derivative comprising the reaction between approximately one molecular proportion of the thiophosgene reaction product of sodium mercapto-benzo-thiazole with slightly more than an equi-molecular proportion of piperidine.

16. The process for preparing a mercapto thiazole derivative comprising the reaction between an amine and the product obtained by reacting a salt of mercapto-aryl-thiazole with a chlorine derivative of carbon disulfid.

In testimony whereof I hereunto affix my signature.

WILLIAM P. ter HORST.